US010643145B2

(12) United States Patent
Yu

(10) Patent No.: US 10,643,145 B2
(45) Date of Patent: May 5, 2020

(54) RELATIONSHIP EXTRACTION

(71) Applicants: Hewlett Packard Enterprise Development LP, Houston, TX (US); Xiaofeng Yu, Beijing (CN)

(72) Inventor: Xiaofeng Yu, Beijing (CN)

(73) Assignee: MICRO FOCUS LLC, Santa Clara, CA (US)

( * ) Notice: Subject to any disclaimer, the term of this patent is extended or adjusted under 35 U.S.C. 154(b) by 1064 days.

(21) Appl. No.: 15/027,810

(22) PCT Filed: Nov. 27, 2013

(86) PCT No.: PCT/CN2013/087963
§ 371 (c)(1),
(2) Date: Apr. 7, 2016

(87) PCT Pub. No.: WO2015/077942
PCT Pub. Date: Jun. 4, 2015

(65) Prior Publication Data
US 2016/0247090 A1    Aug. 25, 2016

(51) Int. Cl.
*G06F 16/248* (2019.01)
*G06N 5/04* (2006.01)
*G06N 7/00* (2006.01)
*G06N 20/00* (2019.01)
(Continued)

(52) U.S. Cl.
CPC .......... *G06N 20/00* (2019.01); *G06F 16/248* (2019.01); *G06F 40/295* (2020.01); *G06F 40/30* (2020.01); *G06N 5/046* (2013.01); *G06N 7/005* (2013.01)

(58) Field of Classification Search
CPC ....... G06F 17/278; G06N 5/046; G06N 7/005
See application file for complete search history.

(56) References Cited

U.S. PATENT DOCUMENTS

| 8,504,490 B2 * | 8/2013 | Nie ................. G06Q 10/10 706/12 |
| 9,390,164 B2 * | 7/2016 | Fang ................. G06F 16/24578 |
| 2009/0019032 A1 | 1/2009 | Bundschus et al. |

(Continued)

FOREIGN PATENT DOCUMENTS

| CN | 102609528 A | 7/2012 |
| CN | 103207856 A | 7/2013 |

OTHER PUBLICATIONS

Yu, Xiaofeng & Lam, Wai, "An Integrated Probabilistic and Logic Approach to Encyclopedia Relation Extraction with Multiple Features", Proceedings of the 22nd International Conference on Computational Linguistics (Aug. 2008), pp. 1065-1072. (Year: 2008).*

(Continued)

*Primary Examiner* — Scott A. Waldron

(57) ABSTRACT

Relationship extraction can include applying unsupervised relationship learning to a logic knowledge base and a plurality of entity groups recognized from a document to provide a probabilistic model. Relationship extraction can include performing joint inference on the probabilistic model to make simultaneous statistical judgments about a respective relationship between at least two entities in one of the plurality of entity groups. Relationship extraction can include extracting a relationship between at least two entities in one of the plurality of entity groups based on the joint inference.

18 Claims, 5 Drawing Sheets

(51) Int. Cl.
   *G06F 40/30* (2020.01)
   *G06F 40/295* (2020.01)

(56) References Cited

U.S. PATENT DOCUMENTS

2010/0138216 A1  6/2010  Tanev
2010/0169311 A1  7/2010  Tengli et al.
2011/0119050 A1  5/2011  Deschacht et al.

OTHER PUBLICATIONS

Yu, Xiaofeng, et al., "An Integrated Discriminative Probabilistic Approach to Information Extraction", ACM Proceedings of CIKM '09, pp. 325-334. (Year: 2009).*

Yu, Xiaofeng & Lam, Wai, "Jointly Identifying Entities and Extracting Relations in Encyclopedia Text via A Graphical Model Approach", Coling 2010: Poster vol. (Aug. 2010), pp. 1399-1407. (Year: 2010).*

Yu, Xiaofeng & Lam, Wai, "Probabilistic Joint Models Incorporating Logic and Learning Via Structured Variational Approximation for Information Extraction", Knowledge Information Systems (published online 2011), vol. 32, pp. 415-444. (Year: 2011).*

Yu, Xiaofeng, et al., "Towards a Top-Down and Bottom-up Bidirectional Approach to Joint Information Extraction", ACM Proceedings of CIKM '11, pp. 847-856. (Year: 2011).*

Wang, Shenling, et al., "Advances of the Semantic Link Network", 8th International Conference on Semantics, Knowledge and Grids, (2012), pp. 120-127. (Year: 2012).*

Culotta, Aron, et al., "Integrating Probabilistic Extraction Models and Data Mining to Discover Relations and Patterns in Text", Proceedings of the Human Language Technology Conference of the North American Chapter of the ACL, pp. 296-303. (Year: 2006).*

Tsuchida, Masaaki, et al., "Toward Finding Semantic Relations not Written in a Single Sentence: An Inference Method using Auto-Discovered Rules", AFNLP Proceedings of the 5th International Joint Conference on Natural Language Processing, pp. 902-910. (Year: 2011).*

Blanco, E, et al, "Unsupervised Learning of Semantic Relatin Composition", Jun. 19-24, 2011.

Jiang Shangpu etal, Learning to Refine an Automatically Extracted Knowledge Base using Markov Logic; 2012 IEEE 12th International Conference on Data Mining; Dec. 31, 2012 ; chapter I-V.

Kiddon, C et al, "Knowledge Extraction and Joint Inference Using Tractable Markov Logic", Jun. 7-8, 2012.

Poon, H et al, "Joint Unsupervised Co-reference Resolution with Markov Logic" Sep. 15, 2008.

Refonaa, J, "Joint Inference in Information Extraction Using Markov Logic", Apr./May 2013

Yan, Y et al, "Unsupervised Relation Extraction by Mining Wikipedia Texts Using Information from the Web", Aug. 2-7, 2009.

International Search Report/Written Opinion; PCT/CN2013/087963; dated Sep. 1, 2014; 13 Pages.

Liu Yongbin et al. Joint Inference Open Information Extraction Based on Markov Logic Networks Computer Science; Sep. 30, 2012; No. 9 vol. 39 Chapter 1-5.

Tan, Y. et al; "Markov Logic Network and Its Applications in Information Extraction" Computer Engineering ; Sep. 30, 2012 ; No. 18 vol. 38 Chapter 1-3.

* cited by examiner

RELATIONSHIP EXTRACTION

BACKGROUND

Relationships can exist within data sets. Relationship learning can include labeling the data and extracting the relationship using statistical methods. Relationships within a data set can facilitate the processing of data and the use of data.

DETAILED DESCRIPTION

Current state of the art information extraction systems are typically supervised and rely on hand-labeled data. However, obtaining labeled data can be time consuming and expensive. Information extraction (IE) can be conducted using structured (e.g., labeled) textual documents. For example, IE can be conducted using supervised systems. But, using a supervised system to perform IE can limit the real-world application of the system. Furthermore, supervised systems can perform IE by decoding, e.g., structuring and/or labeling textual documents, and performing inference separately and independently. Performing decoding from inference separately can result in a loss of dependencies and/or interactions between different entities. As a result, implicit relationships may be missed when performing decoding from inference separately.

In a number of examples, according to the present disclosure, an unsupervised information extraction system can be used for statistical relational learning. The unsupervised information extraction system can integrate a probabilistic graphical model and first-order logic to extract semantic relationships between entities. Joint inference can be performed on the probabilistic graphical model to make simultaneous statistical judgments about a number of relations between the entities. As used herein, an entity is a representation of a person, place, thing, object, time, data, or the like. For example, entities in a textual document include tokens, text, strings, characters, symbols, and/or other representations. A relationship is a representation of a connection between at least two entities.

In a number of examples, joint inference can leverage relationships between entities to extract implicit relationships between the entities. Joint inference can be used to make simultaneous statistical judgments about the relationships for a set of related entities. Joint inference can also be used to exploit relational autocorrelation, an observed characteristic of relational data in which the value of a variable for a first entity is highly correlated with the value of the second entity. Correlation refers to a statistical relationship involving dependency.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

Figure 1:
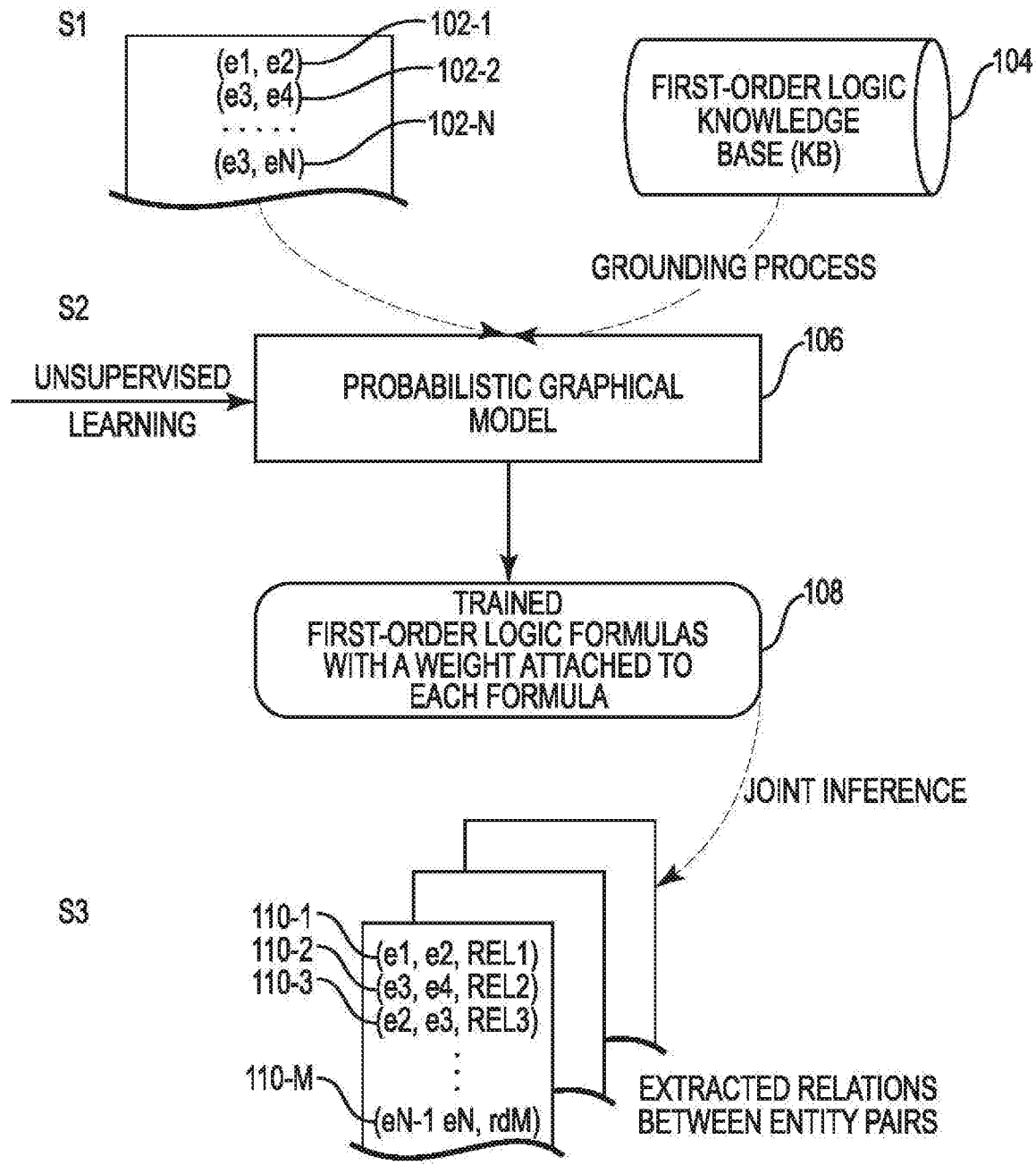
FIG. 1 illustrates a flow diagram of an example of relationship extraction according to the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. As used herein, the designators "N" and "M", among others, indicate that a number of the particular feature so designated can be included with a number of examples of the present disclosure. In addition, the proportion and the relative scale of the elements provided in the figures are intended to illustrate the examples of the present disclosure, and should not be taken in a limiting sense. FIG. 1 illustrates a flow diagram of an example of relationship extraction according to the present disclosure.

FIG. 1 includes a plurality of entity pairs 102-1, 102-2, ..., 102-N, a first-order logic knowledge base (KB) 104, a probabilistic graphical model 106, and a number of relationships 110-1, 110-2, 110-3, ..., 110-M between entity pairs. Unsupervised learning can be applied to the logic KB 104 and a plurality of relationship pairs 102-1, 102-2, ..., 102-N to provide the probabilistic graphical model 106. Unsupervised learning can also provide trained first-order logic formulas with a weight attached to each formula as shown at 108. Joint inference is performed on the probabilistic model to make simultaneous statistical judgments about a respective relationship between at least two entities 102-1, 102-2, ..., 102-N in one of the plurality of entity groups. Relationships 110-1, 110-2, 110-3, ..., 110-M are extracted between at least two entities in one of the plurality of entity groups based on the joint inference.

Entities can be persons, locations, organizations, dates, times, and/or currencies, among other types of entities. For example, example entities are "a," "Walton," "1943," and "!@#". Entities are referred to herein as entities and/or constants. That is, an entity "Walton" can also be referred to as a constant "Walton." A number of constants can be represented by a variable, A relationship can represent a connection between two entities. A relationship can be a friendship relationship and/or an employed by relationship, among other examples of relationships. For example, an entity "Rick" may have a friendship relationship with an entity "John", which could represent that Rick is friends with John.

Information extraction (IE) identifies entities in a textual document and labels the entities by transforming the textual documents into a structured database. Labeled data is data that is associated with a label and/or a number of labels. IE can be performed using a supervised approach or an unsupervised approach. Supervised relationship learning assigns relationships to entities using hand-labeled data. A user that associates entities with relationships creates hand-labeled data that has been manually labeled by a user as opposed to being automatically labeled. Furthermore, hand-labeled data is data that has had a number of labels confirmed by a user.

In contrast, unsupervised relationship learning can assign relationships to entities that are known and recognized but that do not have recognized relationships and/or labels. That is, unsupervised relationship learning automatically assigns labels and/or relationships to a plurality of entity groups recognized from a document.

For example, given a textual sentence "Bill Gates is the chairman of Microsoft" and the recognized entities "Bill Gates", e.g., a person name, and "Microsoft", e.g., an organization name, an entity pair (Bill Gates, Microsoft) can be constructed. The relationship between the entity pair (Bill Gates, Microsoft) can be unlabeled if the relationship between "Bill Gates" and "Microsoft" does not have an associated label and/or is not recognized. The relationship between the entity pair (Bill Gates, Microsoft) can be labeled if the relationship between "Bill Gates" and "Microsoft" has an associated label. The relationship between the entity pair (Bill Gates, Microsoft) can be hand-labeled if the relationship between "Bill Gates" and "Microsoft" has an associated label that was manually-labeled by a user.

Creating hand-labeled data can be time consuming and expensive. As a result, the availability of structured textual documents to perform IE can be limited, which in turn can limit the application of supervised systems to only those scenarios where structured documents are available.

Unsupervised approaches to IE are attractive due to the availability of large quantities of unlabeled textual documents. Unlabeled textual documents, for example, can include web pages such as Wikipedia, portable document format (PDF) documents, books, audio files, and/or other documents that can be converted into a textual representation of the document. For example, an audio file can be embodied in a textual document. The words used in the audio file can be converted to text and can be included in the textual document. Textual documents can include documents that originate from a single source and/or documents that originate from a number of different sources. Textual documents can include documents that are of a same type and/or documents that are of different types. The ability to use unlabeled textual documents provides greater flexibility over the use of labeled textual documents because unlabeled textual documents are readily available and because unlabeled textual documents from different sources can be combined to perform IE.

In a number of examples, the entity pairs can be extracted from a number of documents. All of the documents can exist in an electronic format and/or in a physical format. Each of the entities in an entity grouping, e.g., entity pair 102, can be extracted from a same document and/or a different document. For example, entity pair 102-1 can be extracted from a first textual document, from two different textual documents, and/or from a text document and an audio file. That is, in some examples, e1 can be extracted from a first textual document and e2 can be extracted from a second textual document.

In a number of examples, unsupervised relationship learning can be applied to a logic knowledge base and a plurality of entity groups recognized from a document to provide a probabilistic model. Each of the entity groups can include at least two entities. For example, entities can be grouped in pairs as shown in FIG. 1, Entity pair 102-1 includes entity e1 and entity e2, entity pair 102-2 includes entity e3 and entity e4, . . . , and entity pair 102-N includes entity eN-1 and entity eN, e.g., referred to generally as entity pairs 102. In a number of examples, an entity group can include three or more entities.

A logic KB can be a repository of logic that can be used to associate entities in an entity pair with a relationship. A logic KB can be a first-order logic KB 104. A first-order logic KB 104 can be a repository, e.g., database, of first-order logic formulas. An example of a number of first-order logic formulas is shown in Table 1.

TABLE 1

Examples of first-order logic formulas wife(x, y) $\Rightarrow$ husband(y, x)
father(x, y) $\Rightarrow$ son(y, x) $\vee$ daughter(y, x)
brother(x, y) $\Rightarrow$ brother(y, x) $\vee$ sister(y, x)
husband(x, y) $\wedge$ daughter(z, x) $\Rightarrow$ mother(y, z)
father(x, y) $\wedge$ father(y, z) $\Rightarrow$ grandfather(x, z)
founder(x, y) $\wedge$ superior(x, z) $\Rightarrow$ employer(z, y)
associate(x, y) $\wedge$ member_of(x, z) $\Rightarrow$ member_of(y, z)
executive(x, y) $\wedge$ member_of(z, y) $\Rightarrow$ superior(x, z)

A first-order logic formula can include constants, variables, functions, and predicates. Constants are entities in the domain of interest, e.g., e1, e2, e3, eN, among other examples. Variables represent a number of constants. For example, the variable x can represent any one of the entities e1, e2, e3, eN. Functions represent mappings from tuples of entities to entities. As used herein, a tuple of entities is an order pair of entities. Predicates represent relationships among entities in the domain or attributes among entities in the domain. A predicate can have a true or false value after an evaluation of the predicate as applied to a discrete number of terms. In a number of examples, variables and constants can be associated with a type such that variables with a first type can represent constants with the first type and not constants with a second type. A term is any expression representing an entity in the domain. A term can be a constant, a variable, or a function applied to a tuple of terms. For example, a term can be e1, x, and greatestCommonDivisor(x, y). A ground term is a term containing no variable.

An atomic formula or atom is a predicate applied to a tuple of terms. For example, father(x,y) is an atomic formula. The atomic formula father(x,y) can be interpreted as "x is the father of y." An atomic formula and a formula can be associated with a true or false value. For example, the statement "x is the father of y", e.g., father(x,y), can be true if x in fact is the father of y. Formulas can be composed of a number of atomic formulas. For example, father(x,y) $\wedge$ father (y,z)=>grandfather(x,z), where $\wedge$ is a conjunction ("and"), is a formula where father(x,y), father(y,z), and grandfather(x,z) are atomic formulas and/or predicates. Other examples of formulas include $\neg$ father(x,y), where $\neg$ is a "not", which is true "if and only if" (iff) father(x,y) is false; father(x,y) $\wedge$ father(y,z), e.g., conjunction, which is true iff both father(x,y) and father(y,z) are true; father(x,y) $\vee$ father(y,z), e.g., where $\vee$ is a disjunction ("or"), which is true iff father(x,y) or father(y,z) are true; and wife(x,y)=>husband(y,x), e.g., implication, which is true iff wife(x,y) is false or husband(y,x) is true, among other examples of formulas.

A probabilistic model can be a probabilistic graphical model 106. In a number of examples a probabilistic graphical model 106 can be a Markov Logic Network (MLN). For example, a probabilistic graphical model 106 can model relationships between entities in an undirected graph. A probabilistic graphical model 106 is defined by the first-order logic KB 104, the entity pairs 102, and a number of weights. Weights can be associated with the first-order logic formulas that define the first-order logic KB 104. One of the weights can be associated with each of the formulas. The weights can be used to jointly determine the probabilities of the first-order logic formulas via a log-linear model. In a similar fashion, the probabilities of the first-order logic formulas can be used to determine the weights that are associated with the first-order logic formulas.

The first-order logic formulas can be a set of hard constraints. A hard constraint defines a constraint that is either true or false. That is, a hard constraint is always true or is always false. However, the probabilistic graphical model 106 softens the hard constraints by reducing the probability associated with a first-order logic formula when a grounding of the formula is false. That is, a soft constraint can be true in some instances and false in other instances. The probability associated with the formula can increase as the grounded formulas that are false decrease. The probability distribution of a particular truth assignment x to X specified by a ground Markov network is given by:

$$P(X = x) = \frac{1}{Z}\exp(\Sigma_i w_i n_i(x))$$ (Eq. 1)

$$= \frac{1}{Z}\Pi_i \phi_i(x_{\{i\}})^{n_i(x)}$$

In the above probability distribution, X is the set of all propositions described by grounding the predicates with the constants in a given domain. $w_i$ is the weight associated with the first-order logic formula $F_1 \in \mathcal{F}$, $\mathcal{F}$ is the set of all first-order logic formulas in the first-order logic KB 104, $n_i(x)$ is a number of true groundings of $F_1$ in x, $x_{\{i\}}$ is the true value of the atoms appearing in $F_1$, Z is the normalizing partition function, $\phi_i$ is a real-valued potential function, and $\phi_i(x_{\{i\}})=e^{w_i}$.

For example, given a world with only one first-order logic formula, Smoke(x)⇒Cancer(x) and one constant a, then there is one possible grounding of the first-order logic formula. The grounding is given as Smoke(a)⇒Cancer(a). In a different world with one first-order logic formula and two constants there would be two groundings of the first-order logic formula. There are four possible worlds that are associated with the grounding of the single first-order logic formula that is associated with a single constant. A first world is defined by Smoke(a) being true and Cancer(a) being true. That is, a world where a smokes and a has cancer. A second world is defined by Smoke(a) being true and Cancer(a) being false. A third world is defined by Smoke(a) being false and Cancer(a) being true. A fourth world is defined by Smoke(a) being false and Cancer(a) being false.

The probability of the first world is given by P(1,1) because a true predicate is given as 1, the probability of the second world is given by P(1,0), the probability of the third world is given by P(0,1), and the probability of the fourth world is given by P(0,0). That is, there are four different possible worlds or four different states of the world x∈{(0, 0), (0,1), (1,0), (1,1)}. A probability can be given for more and/or less groundings as those used herein. For P(1,1) in the above probability distribution $w_i$ can be a weight associated with the formula Smoke(x)⇒Cancer(x), $n_i(x)$ is equal to 1 because the grounding Smoke(a)⇒Cancer(a) is true when Smoke(a) is true and Cancer(a) is true, i is equal to 1 because there is only one first-order logic formula. That is, P(1,1) is equal to $$\frac{1}{Z}e^{w+1}$$

as defined by the above probability distribution P(X=x).

Predicates represent relations, e.g., member_of(e1, e2), among entities, e.g., e1 and e2. Markov logic makes it possible to specify probability distributions over complex relational domains.

Unsupervised relationship learning can be the process of learning the real values that are associated with the weights 108 that are associated with the first-order logic formulas without relationship labeled data. Unsupervised learning in Markov logic maximizes the conditional log-likelihood:

$$L(x,y)=\log P(Y=y|X=x)=\log \Sigma_z P(Y=y,Z=z|X=x)$$

Where Z is a number of unknown predicates. In the probabilistic graphical model 106, for relational extraction, Z can be different relations between entities. With Z the optimization problem is no longer convex. However, a local optimum can be found using gradient descent, with the gradient being:

$$\frac{\partial}{\partial w_i}L(y) = E_{Z|y}[n_i] - E_{Y,Z}[n_i].$$

Where $n_i$ is the number of true groundings of the i-th formula, where $E_{Z|y}[n_i]$ is an expected value of Z given y, and where $E_{Y,Z}[n_i]$ is an expected value of Y and Z.

The pre-conditioned scaled conjugate gradient (PSCG) algorithm can be extended for unsupervised learning. The gradient is the difference of two expectations, each of which can be approximated using a slice sampling algorithm. The slice sampling algorithm can be a slice sampling Markov chain Monte Carlo algorithm (MC-SAT). A slice sampling algorithm can also be a Gibbs sampling algorithm among other algorithms that can be used to approximate the gradient. The (i, j)-th entry of the Hessian can be given as:

$$\frac{\partial^2}{\partial w_i \partial w_j}L(y) = Cov_{Z|y}[n_i, n_j] - Cov_{Y,Z}[n_i, n_j].$$

Where $n_i$ and $n_j$ are the number of of true groundings of the i-th and j-th formulas respectively, where $Cov_{Z|y}$ is the covariance of Z given y and $Cov_{Y,Z}$ is the covariance of Y and Z. The step size can be computed accordingly. Since the problem is no longer convex, the negative diagonal Hessian can contain zero or negative entries. The pre-condition can be the inverse of the absolute value of the diagonal plus 1.

When entities form independent subsets, the entities can be processed in parallel to gather statistics for learning. A parallelized implementation of unsupervised learning can include the message-passing interface (MPI). During learning, each first-order formula is converted to Conjunctive Normal Form (CNF). The probabilities of all formulae collectively determine all weights 108.

In a number of examples, joint inference can be performed on the probabilistic model to make simultaneous statistical judgments about a respective relationship between at least two entities in one of the plurality of entity groups. Joint inference is the process of drawing a conclusion from data given a number of variables.

Joint inference can be performed using a slice sampling algorithm. Joint inference can be performed using a Markov chain Monte Carlo (MCMC) algorithm, MC-SAT is an example of a slice sampling MCMC algorithm. MC-SAT requires a complete grounding of all atoms of the first-order logic formulas in the first-order logic KB 104. The lazy version of MC-SAT, namely Lazy-MC-SAT, is another example of an MCMC algorithm. That is, joint inference can be performed using Lazy-MC-SAT. Lazy-MC-SAT works by repeatedly selecting a function or a variable and re-computing its value. In the Lazy-MC-SAT the value of a variable/function depends only on the values of a subset of the other variables/functions. That is, using Lazy-MC-SAT does not require a complete grounding of all atoms of the first-order logic formulas. Using Lazy-MC-SAT to provide joint inference can reduce the time and memory required to calculate joint inference over using MC-SAT to provide joint inference.

MC-SAT can be initialized with the state returned by MaxWalkSAT, rather than a random solution to the hard clause to reduce burn-in time. MaxWalkSAT is a weighted version of the WalkSAT algorithm. The WalkSAT algorithm is a local search algorithm. MC-SAT treats each ground clause as a separate factor while determining the slice. This can be inefficient for highly correlated clauses. MC-SAT can be extended to treat each set of mutually exclusive and exhaustive rules as a single factor.

Joint inference can be used to make simultaneous statistical judgments about the relations for a set of related entities, thus taking into account implicit relationship, e.g., rich and deep dependencies, and correlations between entities. As used herein, implicit relations are those that do not have direct contextual evidence in a textual document. In a number of examples, joint inference can leverage relationships between entities to extract implicit relationships between the entities. Implicit relationships are further discussed with respect to FIG. 2. Joint inference can also be used to exploit relational autocorrelation. Correlation refers to a statistical relationship involving dependency. Relational autocorrelation is a characteristic of relational data in which the value of a variable for one instance is correlated with the value of the same variable on another instance.

Thus, a relationship between at least two entities in one of the plurality of entity groups can be extracted based on the joint inference. For example, the relationship 110-1 can be associated with entity pair 102-1, the relationship 110-2 can be associated with entity pair 102-2, the relationship 110-3 can be associated with the entities e2 and e3, and the relationship 110-M can be associated with entity pair 102-N. The relationship between the entities in a group can be based on the joint inference associated with the first-order logic formulas, shown in Table 1. For example, a relationship can be associated with the entities in a pair when the relationship is associated with a first-order logic formula and when the first-order logic formula is associated with a joint inference. In the previous example, the joint inference provides a higher probability for the first-order logic formula than the probabilities that are associated with the other first-order logic formulas.

Figure 2:
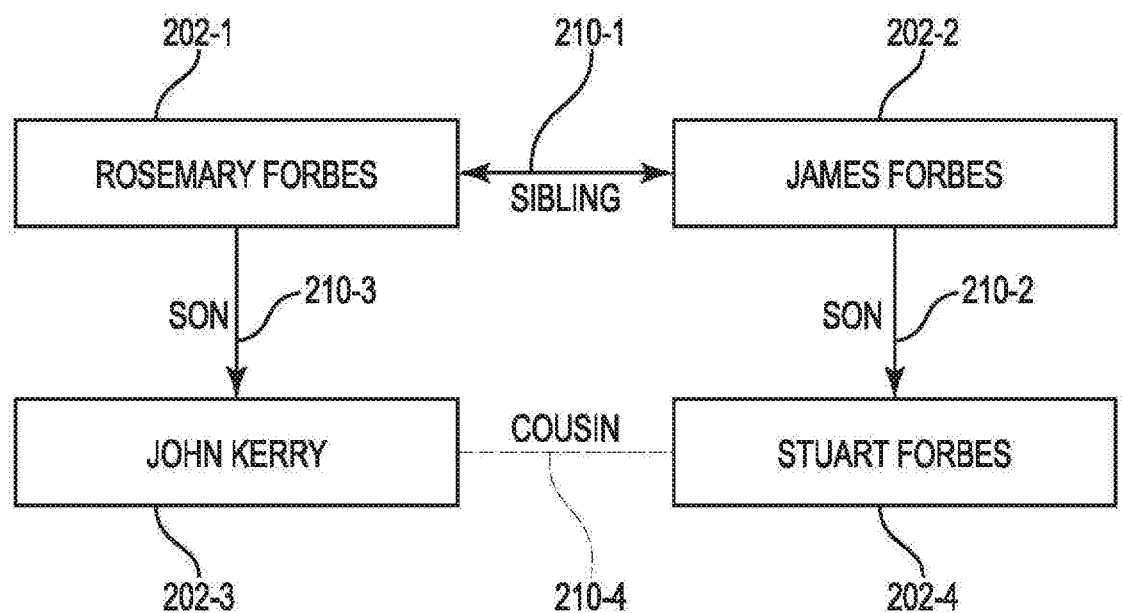
FIG. 2 illustrates a block diagram of an example of an implicit relationship according to the present disclosure.

FIG. 2 illustrates a block diagram of an example of an implicit relationship according to the present disclosure. FIG. 2 includes entity 202-1, entity 202-2, entity 202-3, entity 202-4, e.g., referred to generally as entities 202, relationship 210-1, relationship 210-2, relationship 210-3, and relationship 210-4, e.g., referred to generally as relationships 210.

Entity 202-1 has a value of Rosemary Forbes. Entity 202-2 has a value of James Forbes. Entity 202-3 has a value of John Kerry. Entity 202-4 has a value of Stuart Forbes. In FIG. 2, the relationships 210 are based on the following sentences:

1. Rosemary Forbes is the mother of John Kerry
2. Rosemary Forbes has a sibling James Forbes
3. James Forbes's son in Stuart Forbes
4. John Kerry celebrated with Stuart Forbes on the graduation ceremony Entities can be extracted from the above sentences. For example, Rosemary Forbes, John Kerry, James Forbes, and Stuart Forbes are entities that can be extracted from the above sentences. The entities can be grouped in groups of two. A first group (Rosemary Forbes, John Kerry) can be based on the first sentence. A second group (Rosemary Forbes, James Forbes) can be based on the second sentence. A third group (James Forbes's, Stuart Forbes) can be based on the third sentence. A fourth group (John Kerry, Stuart Forbes) can be based on the fourth sentence. Formulas and/or predicates can define relationships between the entities. For example, a first formula parent(x, y)$\Rightarrow$ Child (y, x) can define a relationship between entities in the first group as a parent/child/son relationship denoted by relationship 210-3. The first formula can also define a relationship between the entities in the third group as a parent/child/son relationship, e.g., relationship 210-2. A second formula sibling(x, y)$\Rightarrow$sibling(y, x) which can define a relationship between the entities in the second group as a sibling relationship, e.g., relationship 210-1.

In a number of examples, a relationship can be a simple relationship and/or an implicit relationship. As used herein, the terms relationship and simple relationship are used interchangeably. A simple relationship can include a relationship that has explicit support in a textual document, e.g., the above sentences. For example, a simple relationship, as described above, can be a parent/child/son relationship and a sibling relationship.

An implicit relationship is a relationship between at least two entities that does not have explicit support in the textual document. For example, a cousin relationship is not explicitly supported in the above four sentences. However, by combining the above formulas a new formula can be created that defines an implicit relationship between at least two entities. For example, an implicit relationship can be defined by the formula parent(x, z)$\land$sibling(z,w)$\land$child(w, y)$\Rightarrow$cousin(x, y). The implicit relationship can be that of cousin. The implicit relationship can be applied to the group (John Kerry, Stuart Forbes), Relationship 210-4 is an implicit relationship because there is no explicit support for the cousin relationship in the above four sentences. In a number of examples, the formula parent(x, z)$\land$sibling(z,w) $\land$child(w, y)$\Rightarrow$cousin(x, y) can be provided at the same time that the other first-order logic formulas are provided. The above-mentioned Table 1 contains other examples of first-order logic formulas that can be used to associate an implicit relationship between at least two entities.

The first group, the second group, the third group, and the fourth group can constitute recognized entity pairs because the existence of a relationship is assumed based on the textual document, e.g., the four sentences, and/or based on the fact that the groups were grouped before they were provided to the probabilistic graphical model as input. That is, the first group, the second group, the third group, and the fourth group can constitute recognized entity pairs because there is explicit support for a grouping of the entity pairs in a group in the textual document. There is no explicit support for the group (John Kerry, Stuart Forbes) in the textual document. That is, the group (John Kerry, Stuart Forbes) is created based on the constants, the relationships and/or the implicit relationships, and the first-order logic formulas.

Figure 3:
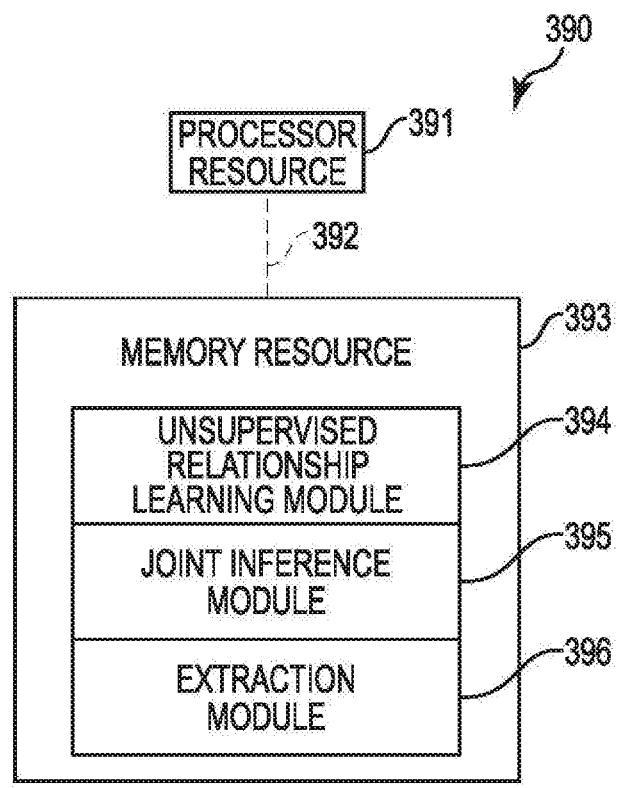
FIG. 3 illustrates a block diagram of an example of a computing device according to the present disclosure.

FIG. 3 illustrates a block diagram of an example of a computing device according to the present disclosure. The computing device 390 can utilize software, hardware, firmware, and/or logic to perform a number of functions described herein.

The computing device 390 can be any combination of hardware and program instructions configured to pre-populate a form. The hardware, for example can include a processor resource 391 and/or a memory resource 393, e.g., machine readable medium (MRM), database, etc. A processor resource 391, as used herein, can include any number of processors capable of executing instructions stored by a memory resource 393. The processor resource 391 may be integrated in a single device or distributed across multiple devices. The program instructions, e.g., machine-readable instructions (MRI), can include instructions stored on the memory resource 393 and executable by the processor resource 391 to implement a desired function, e.g., relationship extraction.

The memory resource 393 can be in communication with a processor resource 391. A memory resource 393, as used herein, can include any number of memory components capable of storing instructions that can be executed by processor resource 391. Such memory resource 393 can be a non-transitory MRM. The memory resource 393 may be integrated in a single device or distributed across multiple devices. Further, the memory resource 393 may be fully or partially integrated in the same device as the processor resource 391 or it may be separate but accessible to that device and processor resource 391. Thus, it is noted that the computing device 390 may be implemented on a participant device, on a server device, on a collection of server devices, and/or on a combination of the participant device and the server device.

The memory resource 393 can be in communication with the processor resource 391 via a communication link, e.g., path, 392. The communication link 392 can be local or remote to a machine, e.g., a computing device, associated with the processor resource 391. Examples of a local communication link 392 can include an electronic bus internal to a machine, e.g., a computing device, where the memory resource 393 is one of volatile, non-volatile, fixed, and/or removable storage medium in communication with the processor resource 391 via the electronic bus.

A number of modules 394, 395, 396 can include MRI that when executed by the processor resource 391 can perform a number of functions. The number of modules 394, 395, 396 can be sub-modules of other modules. For example, the unsupervised relationship learning module 394 and the joint inference module 395 can be sub-modules and/or contained within the same computing device. In another example, the number of modules 394, 395, 396 can comprise individual modules at separate and distinct locations, e.g., MRM, etc.

Each of the modules 394, 395, 396 can include instructions that when executed by the processor resource 391 can function as a corresponding engine as described herein. For example, the unsupervised relationship learning module 394 can include instructions that when executed by the processor resource 391 can function as an unsupervised relationship learning engine.

In the example of FIG. 3, an unsupervised relationship learning module 394 can comprise MRI that are executed by the processor resource 391 to apply unsupervised relationship learning to a logic knowledge base and a plurality of entity groups recognized from a document to provide a probabilistic model. A logic knowledge base can be a repository of first-order logic formulas. The probabilistic model can be defined by the first-order logic formulas, weights that are associated with the first-order logic formulas, and the entity pairs and/or the entities in the entity pairs. An association between the weights and the first-order logic formulas can be defined by associating one of the weights with each of the first-order logic formulas.

In a number of examples, associated weights collectively provide probabilities that are associated with the first-order logic formulas. The probabilities of the first-order logic formulas can be provided via a log-linear model.

In a number of examples, a relationship between at least two entities in one of the plurality of entity groups. A relationship between at least two entities is a most likely relationship between at least two entities in one of the plurality of entity groups. A most likely relationship indicates that the first-order logic formula that is associated with the most likely relationship has a higher probability of being true when grounded with the two entities than the other first-order logic formulas.

A joint inference module 395 can comprise MRI that are executed by the processor resource 391 to perform joint inference on the probabilistic model to make simultaneous statistical judgments about a respective relationship between at least two entities in one of the plurality of entity groups. An extraction module 396 can comprise MRI that are executed by the processor resource 391 to extract a relationship between at least two entities in one of the plurality of entity groups based on the joint inference. The relationship between at least two entities in one of the plurality of entity groups can be extracted using the first-order logic formulas.

Figure 4:
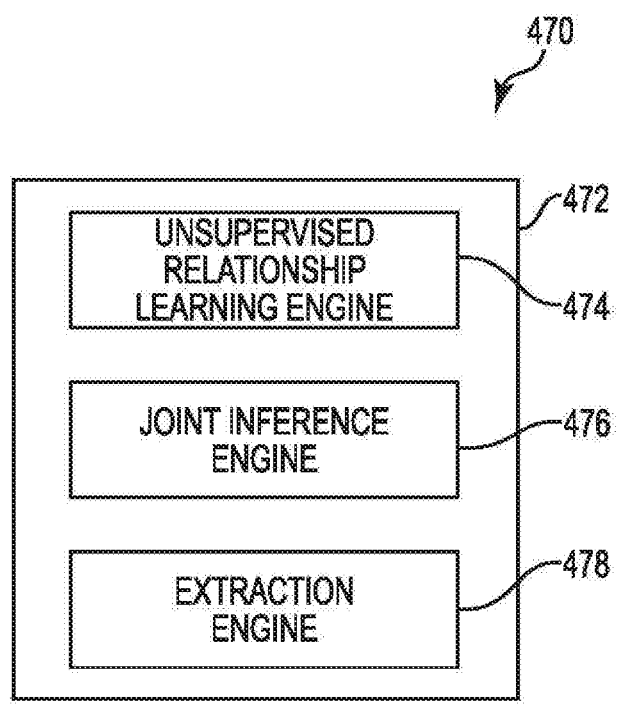
FIG. 4 illustrates a block diagram of an example of a system for relationship extraction according to the present disclosure.

FIG. 4 illustrates a block diagram of an example of a system for relationship extraction according to the present disclosure. The system 470 can include a computing system 472, and/or a number of engines 474, 476, 478. The computing system 472 can include the engines, e.g., unsupervised relationship learning engine 474, joint inference engine 476, extraction engine 478, etc. The computing system 472 can include additional or fewer engines than illustrated to perform the various functions described herein.

The engines can include a combination of hardware and programming that is configured to perform a number of functions described herein, e.g., relationship extraction, etc. The programming can include program instructions, e.g., software, firmware, etc., stored in a memory resource, e.g., machine readable medium, etc. as well as hard-wired program, e.g., logic.

The unsupervised relationship learning engine 474 can include hardware and/or a combination of hardware and programming to apply unsupervised relationship learning to a first-order logic knowledge base and a plurality of entity pairs recognized from a textual document to provide a probabilistic graphical model. The joint inference engine 476 can include hardware and/or a combination of hardware and programming to perform joint inference on the probabilistic graphical model to make simultaneous statistical judgments about a respective relationship between each of the entity pairs.

The extraction engine 478 can include hardware and/or a combination of hardware and programming to extract a relationship between an entity pair based on the joint inference. Extracting a relationship between an entity pair can include extracting a relationship between the recognized entity pairs. For example, an implicit relationship between an entity pair can be based on a simple relationship between the entity pairs. In a number of examples, a number of probabilistic determinations can be made in parallel for a number of entity pairs to make a statistical judgment about the respective relationships between the entity pairs. A relationship between an entity pair can include relationally auto-correlate a first variable pertaining to a first recognized entity pair with a second variable pertaining to a second recognized entity pair to extract the relationship between the first variable and the second variable based on the joint inference.

Figure 5:
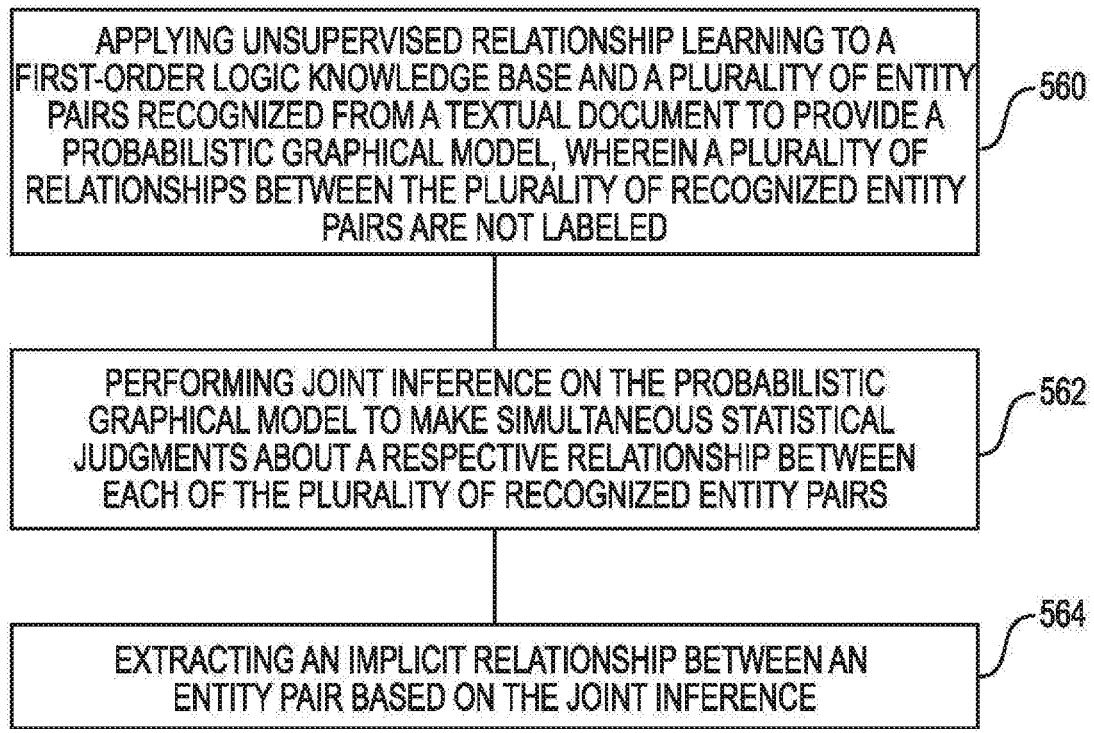
FIG. 5 illustrates a flow diagram of an example of a method for relationship extraction according to the present disclosure.

FIG. 5 illustrates a flow diagram of an example of a method for relationship extraction according to the present disclosure. At 560, unsupervised relationship learning can be applied to a first-order logic knowledge base and a plurality of entity pairs recognized from a textual document to provide a probabilistic graphical model. In a number of examples, a plurality of relationships between the plurality of recognized entity pairs are not labeled. The term unsupervised makes reference to the fact that the recognized entity pairs are not labeled.

At 562, joint inference can be performed on the probabilistic graphical model to make simultaneous statistical judgments about a respective relationship between each of the recognized entity pairs.

At 564, an implicit relationship between an entity pair can be extracted based on the joint inference. In a number of examples, extracting the implicit relationship between an entity pair can include extracting an implicit relationship between the entity pairs using the first-order logic formulas and a number of relationships that are associated with the entity pairs. In a number of examples, a portion of the first-order logic formulas can represent implicit relationships. In a number of examples, first-order logic formulas can be constructed to represent implicit relationships in the probabilistic graphical model.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A non-transitory machine-readable medium storing instructions for relationship extraction executable by a machine to cause the machine to:
   apply unsupervised relationship learning to a logic knowledge base and a plurality of entities extracted from a document to generate a plurality of first-order logic formulas that represent explicit relationships between the plurality of entities as described in the document;
   associate a plurality of weights to the plurality of first-order logic formulas;
   subsequent to associating the plurality of weights to the plurality of first-order logic formulas, combine the plurality of first-order logic formulas to create a new first-order logic formula of a probabilistic model for inferring an implicit relationship between two entities of the plurality of entities, wherein the two entities have an undefined relationship in the document;
   perform a joint inference on the new first-order logic formula of the probabilistic model to define the implicit relationship between the two entities; and
   extract the implicit relationship between the two entities based on the joint inference.

2. The non-transitory machine-readable medium of claim 1, wherein the implicit relationship between the two entities is a most likely relationship between the two entities.

3. The non-transitory machine-readable medium of claim 1, wherein the probabilistic model includes the plurality of first-order logic formulas and the plurality of weights associated with the plurality of first-order logic formulas.

4. The non-transitory machine-readable medium of claim 3, wherein each of the plurality of weights is associated with one of the plurality of first-order logic formulas.

5. The non-transitory machine-readable medium of claim 4, wherein the plurality of weights collectively provide a plurality of probabilities that are associated with the plurality of first-order logic formulas.

6. The non-transitory machine-readable medium of claim 5, wherein the plurality of probabilities associated with the plurality of first-order logic formulas are provided via a log-linear model.

7. The non-transitory machine-readable medium of claim 1, wherein the instructions executable to cause the machine to extract the implicit relationship between the two entities include instructions that are executable to cause the machine to use the new first-order logic formula to extract the implicit relationship between the two entities.

8. A system for relationship extraction comprising a processing resource and a non-transitory machine readable medium storing instructions that when executed by the processing resource cause the processing resource to:
   apply unsupervised relationship learning to a first-order logic knowledge base and a plurality of entities extracted from a document to generate a plurality of first-order logic formulas that represent explicit relationships between the plurality of entities as described in the document;
   associate a plurality of weights to the plurality of first-order logic formulas;
   subsequent to associating the plurality of weights to the plurality of first-order logic formulas, combine the plurality of first-order logic formulas to create a new first-order logic formula of a probabilistic graphical model for inferring an implicit relationship between two entities of the plurality of entities, wherein the two entities have an undefined relationship in the document;
   perform a joint inference on the new first-order logic formula of the probabilistic graphical model to define the implicit relationship between the two entities; and
   extract the implicit relationship between the two entities based on the joint inference.

9. The system of claim 8, including instructions executable to cause the processing resource to extract a relationship between a recognized entity pair of the plurality of entities.

10. The system of claim 9, including instructions executable to cause the processing resource to make a plurality of probabilistic determinations in parallel for a plurality of recognized entity pairs of the plurality of entities.

11. The system of claim 8, wherein the instructions executable to cause the processing resource to extract the implicit relationship between the two entities includes instructions executable to cause the processing resource to relationally auto-correlate a variable pertaining to a first recognized entity pair with a variable pertaining to a second recognized entity pair to extract the implicit relationship between the two entities based on the joint inference.

12. The system of claim 8, wherein the instructions executable to cause the processing resource to associate the plurality of weights to the plurality of first-order logic formulas include instructions that are executable to cause the processing resource to associate each of the plurality of weights to one of the plurality of first-order logic formulas.

13. The system of claim 12, wherein the plurality of weights collectively provide probabilities associated with the plurality of first-order logic formulas, and wherein the probabilities associated with the plurality of first-order logic formulas are provided via a log-linear model.

14. A method for relationship extraction comprising:
applying, by a processor, unsupervised relationship learning to a first-order logic knowledge base and a plurality of entities extracted from a document to generate a plurality of first-order logic formulas that represent explicit relationships between the plurality of entities as described in the document;
associating, by the processor, a plurality of weights to the plurality of first-order logic formulas;
subsequent to associating the plurality of weights to the plurality of first-order logic formulas, combining the plurality of first-order logic formulas to create a new first-order logic formula of a probabilistic graphical model for inferring an implicit relationship between two entities of the plurality of entities, wherein the two entities have an undefined relationship in the document;
performing, by the processor, a joint inference on the new first-order logic formula of the probabilistic graphical model to define the implicit relationship between the two entities; and
extracting, by the processor, the implicit relationship between the two entities based on the joint inference.

15. The method of claim 14, wherein the document is a textual document and does not provide explicit support for the implicit relationship of the two entities.

16. The method of claim 14, wherein associating the plurality of weights to the plurality of first-order logic formulas includes associating each of the plurality of weights to one of the plurality of first-order logic formulas.

17. The method of claim 16, wherein the plurality of weights collectively provide probabilities associated with the plurality of first-order logic formulas, and the probabilities associated with the plurality of first-order logic formulas are provided via a log-linear model.

18. The method of claim 14, wherein the implicit relationship between the two entities is a most likely relationship between the two entities.

* * * * *